(12) United States Patent
VanBlon et al.

(10) Patent No.: US 11,096,017 B2
(45) Date of Patent: Aug. 17, 2021

(54) BROADCASTING RECEIVED IDENTIFYING CHARACTERISTIC

(71) Applicant: Lenovo (Singapore) Pte. Ltd., Singapore (SG)

(72) Inventors: Russell Speight VanBlon, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/928,657

(22) Filed: Mar. 22, 2018

(65) Prior Publication Data

US 2019/0297466 A1    Sep. 26, 2019

(51) Int. Cl.
*H04W 4/06*  (2009.01)
*H04W 4/90*  (2018.01)

(52) U.S. Cl.
CPC .............. *H04W 4/06* (2013.01); *H04W 4/90* (2018.02)

(58) Field of Classification Search
CPC ................................. H04W 4/06; H04W 4/90

USPC ......................................................... 455/404.2
See application file for complete search history.

(56) References Cited

U.S. PATENT DOCUMENTS

| 2014/0155018 | A1* | 6/2014 | Fan | H04W 72/048 |
| | | | | 455/404.1 |
| 2016/0135013 | A1* | 5/2016 | Bietz | H04B 1/3877 |
| | | | | 455/456.1 |
| 2018/0160267 | A1* | 6/2018 | Immendorf | H04W 4/021 |
| 2019/0035242 | A1* | 1/2019 | Vazirani | G08B 29/188 |

* cited by examiner

*Primary Examiner* — Charles N Appiah
*Assistant Examiner* — Frank E Donado
(74) *Attorney, Agent, or Firm* — Ference & Associates LLC

(57) ABSTRACT

One embodiment provides method, including: receiving, from at least one sensor, an identifying characteristic associated with a user, wherein the identifying characteristic comprises at least one of a wireless identifier and a feature associated with the user; broadcasting the identifying characteristic to a network; thereafter receiving, from at least one device, an indication of receipt of the identifying characteristic; and performing, responsive to the indication, an action. Other aspects are described and claimed.

20 Claims, 3 Drawing Sheets

BROADCASTING RECEIVED IDENTIFYING CHARACTERISTIC

BACKGROUND

Advances in technology have increased the capabilities of information handling devices ("devices"), for example smart phones, tablet devices, smart speakers, smart TVs, laptop and personal computers, security systems, and the like. For example, many modern devices may be able to receive and process different input such as electronic device identifiers, image capture data, biometric information, location data, and the like. Additionally, many devices may be associated with or connected to, possibly indirectly, other devices over a network that allows sharing of information.

BRIEF SUMMARY

In summary, one aspect provides a method, comprising: receiving, from at least one sensor, an identifying characteristic associated with a user, wherein the identifying characteristic comprises at least one of a wireless identifier and a feature associated with the user; broadcasting the identifying characteristic to a network; thereafter receiving, from at least one device, an indication of receipt of the identifying characteristic; and performing, responsive to the indication, an action.

Another aspect provides an information handling device, comprising: a display device; a processor; a memory device that stores instructions executable by the processor to: receive, from at least one sensor, an identifying characteristic associated with a user, wherein the identifying characteristic comprises at least one of a wireless identifier and a feature associated with the user; broadcast the identifying characteristic to a network; thereafter receive, from at least one device, an indication of receipt of the identifying characteristic; and perform, responsive to the indication, an action.

A further aspect provides a product comprising: a storage device having code stored therewith, the code being executable by the processor and comprising: code that receives, from at least one sensor, an identifying characteristic associated with a user, wherein the identifying characteristic comprises at least one of a wireless identifier and a feature associated with the user; code that broadcasts the identifying characteristic to a network; code that thereafter receives, from at least one device, an indication of receipt of the identifying characteristic; and code that performs, responsive to the indication, an action.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
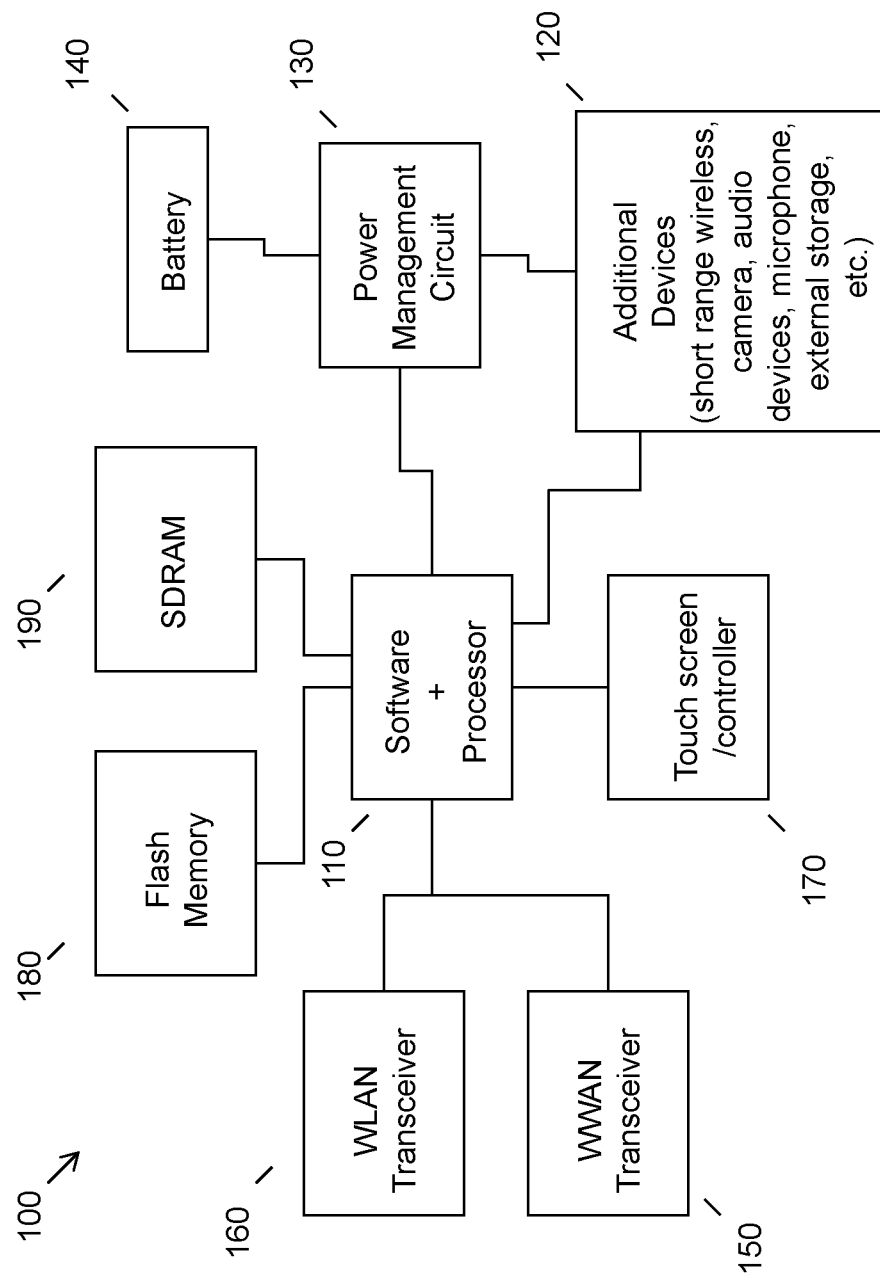
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

An increasing number of users are utilizing devices in daily life. These devices may include smartphone, tablets, computers, dash cams, traffic cams, security systems, and the like. The devices may include components that allow for capturing of information, for example, image capture data, audio data, wireless identification (ID) data, biometric data, location data, or the like. Many of these devices are connected to a network of some type, for example, a cellular network, wireless network, location network, or the like. Thus, these devices are at least indirectly connected to other devices, for example, other devices connected to the same network. In current systems, a device or system associated with the network may leverage some information that is received from all the devices on the system. For example, a traffic application may leverage global positioning system (GPS) or other location information received from a large number of devices to identify traffic delays. However, current systems do not traditional share information directly from one device to other devices on the system. For example, current systems do not receive information from one user device and then disseminate this information or associated information to other user devices on the network. However, the large amount of network connected devices would to assist in sharing information across a large segment of a population. As an example, by leveraging the interconnectivity of these devices to a single network, a large group of users with interconnected devices across a large geographic area may be able to assist in a search for another user.

Conventionally, a search for an individual involves informing a population of a desire to find an individual. For example, an AMBER Alert may be issued for an abducted child. Law enforcement may issue an AMBER Alert and may inform a population through channels such as a "be on the lookout" to authorities, passing the information on to media, text messaging a population, or utilizing traffic signs containing a message. Similar techniques may be used when a Silver Alert or a search for a criminal becomes necessary.

However, there are limitations with these systems. For example, in the case that a large population is texted or otherwise alerted on a device, the alert is generated at a network hub and then disseminated across the devices. In other words, rather than starting the alert with a single device, the authorities must notify the network hub which then disseminates the alert. Additionally, these alerts are generally very sparse and contain little information due to the fact that these alerts are being sent across a variety of devices that may not all have the same capabilities (e.g., one device may only receive text messages and not picture messages, etc.). As another example, an alert may be transmitted to traditional news media outlets. However, with the increasing use of streaming or internet services many users do not listen to or watch local media. Also, information on a traffic sign corresponding to a person of interest may be ignored by passing motorists or contain information that many drivers may not be able to use. This may be the case when a license plate or vehicle description is displayed, but the weather or light conditions make it difficult for motorists to visually identify a vehicle or passenger. Additionally, text alerts may be ignored or may be read by a recipient at the end of their travel limiting the text's usefulness.

Another problem with these conventional systems is that if the person generating the alert does not have a lot of information, particularly identifying information, about the individual, the alert may have very little information and may be essentially useless. In other words, if the person generating the alert only has a single piece of identifying information that does not drastically narrow down the possible population of possibilities, other users may be unsure of what they are looking for or if they have been within proximity to the target individual. For example, if the person generating the alert only knows that a child was last seen a white vehicle, it is very difficult for other people to know if they have seen or come within proximity to the desired individual.

Accordingly, an embodiment provides a system and method for associating an identifying characteristic with other identifying characteristics by broadcasting the identifying characteristic to other devices which can then obtain other identifying characteristic using the known characteristic. In other words, an embodiment provides a system and method for associating an identifying characteristic with other identifying characteristics using network connected devices. The method receives an identifying characteristic associated with a user and broadcasting this identifying characteristic across a network of interconnected devices.

The identifying characteristic may be a wireless identifier (ID), a feature associated with a user, or a combination thereof. For example, if a house is burglarized, one or more sensors associated with the house or the house network may receive or capture an identifying characteristic of the burglar. Sensors may include cameras, audio capture, tablets, smartphone, computers, wireless access points, or the like. Thus, the captured identifying characteristic may include a wireless ID and/or another physical characteristic of the burglar that is identified from a capture source, for example, information identified from image capture data, biometric information, or the like.

The system may then broadcast the identifying characteristic to a network including one or more other devices. The network may be a law enforcement agency, a neighborhood watch group, a group of other users, or the like. For example, an identifying characteristic of a burglar such as the burglar's smartphone identifier may be broadcast to a law enforcement network.

When another of the devices on the network comes within proximity of the identifying characteristic, the device may send an indication of receipt of the identifying characteristic. For example, the burglar's wireless ID may be detected by another device on the network. The device may then provide an indication that the another device has detected the burglar's wireless ID. For example, another user with a device that may opt-in to the network may be in close proximity to the burglar and may detect the burglar's wireless ID using their own device. In response to this detection, the another user's device may provide an indication to the network of the receipt of the burglar's wireless ID.

Once the system receives an indication of receipt of the identifying characteristic, the system may perform an action. In an embodiment, the action performed may be an alert to another user's device. The alert may request the another user take a picture, report further identifying characteristics, or the like to the network. For example, the system may send a request to the detecting device to take a picture of the burglar or of a vehicle associated with the burglar. Additionally or alternatively, the system may report location information of where the burglar's identifying characteristic was received by the another user's device. The action performed may be alerting law enforcement officials or any group of users.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
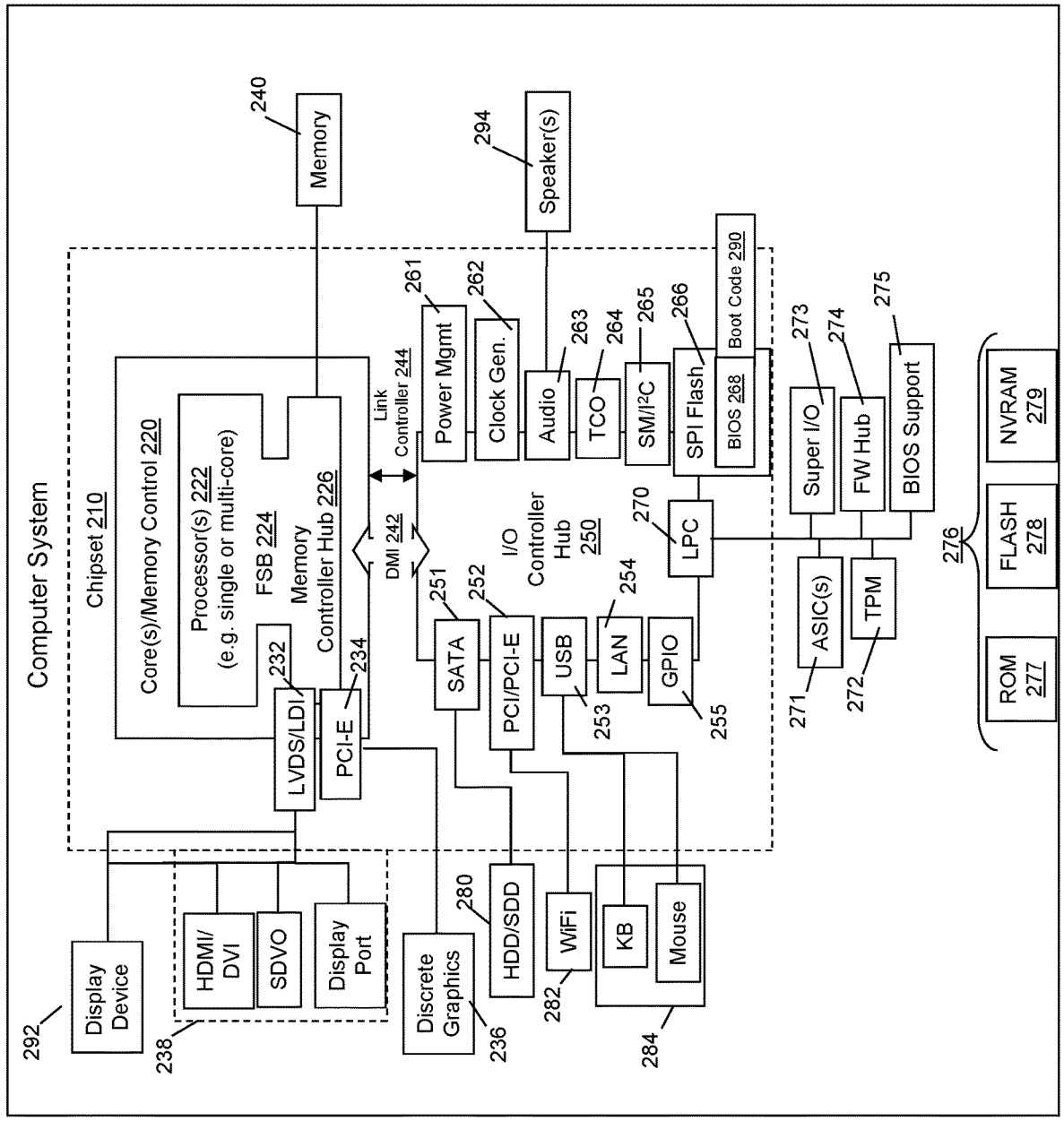
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, wearable headsets, personal computer devices generally, and/or electronic devices that are network capable and receive identifying characteristics described herein. For example, the circuitry outlined in FIG. 1 may be implemented in a tablet or smart phone embodiment, whereas the circuitry outlined in FIG. 2 may be implemented in a personal computer embodiment.

Figure 3:
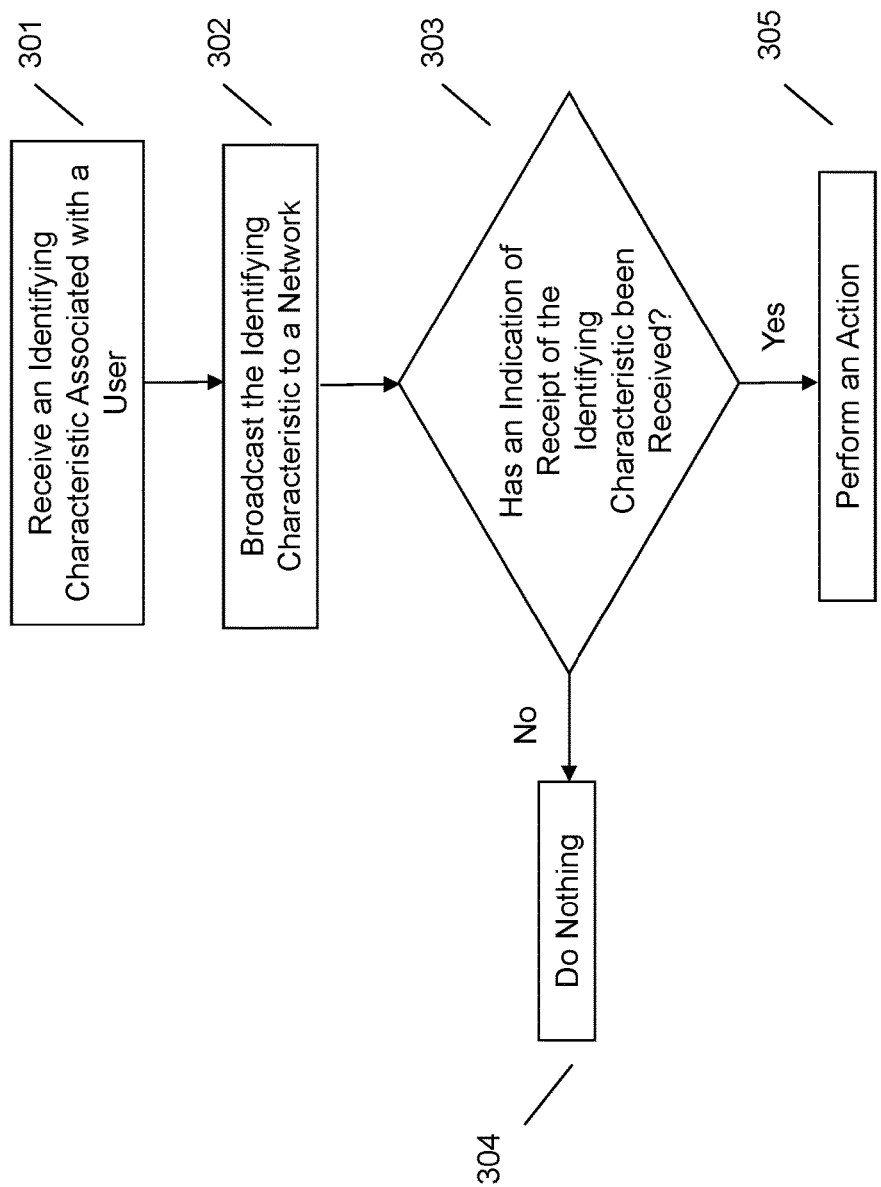
FIG. 3 illustrates an example method of receiving an identifying characteristic and broadcasting the identifying characteristic to devices on a network.

FIG. 3 illustrates an example method of broadcasting an identifying characteristic to a network of interconnected devices and receiving an indication from one of the network devices that the identifying characteristic has been detected and thereafter performing an action responsive to the indication. At 301 an embodiment may receive an identifying characteristic associated with a user at a networked system. The receipt of this identifying characteristic may include receiving the identifying characteristic from another device (e.g., a smartphone, tablet, computer, camera, microphone, wireless access point, router, home security system, personal digital assistant, GPS tag, etc.) that captured the identifying characteristic. The identifying characteristic may be captured by the capturing device responsive to an event, for example, a predetermined or unknown user coming within proximity of the capturing device, an event occurring while an alert status is activated (e.g., a security system is activated and an event occurs, an alert time frame is activated and an event occurs during this time, etc.), a dramatic event occurs, an unknown event occurs, or the like.

The capturing device may use one or more sensors (e.g., image capture sensors, wireless sensors, audio sensors, biometric sensors, etc.) to capture identifying information associated with an individual. Thus, the identifying characteristic may be data associated with or received from one or more sensors. For example, the identifying characteristic may include data from or derived from image capture data (e.g., clothing/accessories, height, weight, etc.), audio data, facial recognition data, biometric data (e.g., fingerprints, retina scans, gait scans, etc.), location data, wireless data (e.g., wireless device identifiers, wireless access point locations, etc.) license plate reader data, electronic toll system data, BLUETOOTH® data, near field communication (NFC) data, barcode data, or the like. The sensor may be integral to the device or operatively coupled to the device, for example, through a wireless connection (e.g., using a BLUETOOTH connection, near field communication (NFC), wireless connection techniques, etc.), a wired connection (e.g., the device is coupled to another device or source, etc.).

As a working example, if a burglar enters a home and carries a smartphone on his/her person, a device in the home may detect an identifying characteristic in the form of the wireless identification (ID) of the burglar's smartphone. Additionally or alternatively, an image capture device may capture an identifying characteristic such as facial information. Additionally or alternatively, a microphone may capture audio data of the burglar which may result in voice data as an identifying characteristic. Other forms and modalities of capturing identifying characteristics are disclosed and contemplated. Accordingly, other identifying characteristics are possible and contemplated.

In an embodiment, the detecting device sensors may be configured to continuously search for and detect identifying characteristics by maintaining one or more sensors in an active state. The one or more sensors may, for example, continuously detect identifying characteristics even when other sensors (e.g., microphones, speakers, other sensors, etc.) associated with the electronic device are inactive. Alternatively, the electronic device detecting sensors may remain in an active state for a predetermined amount of time (e.g., 30 minutes, 1 hour, 2 hours, etc.). Subsequent to not capturing any identifying characteristics during this predetermined time window, an embodiment may switch the electronic device detecting sensors to a power off state. The predetermined time window may be preconfigured by a manufacturer or, alternatively, may be configured and set by one or more users. In another embodiment, the electronic device detecting sensors may attempt to detect identifying characteristics responsive to receiving a user command to detect. For example, a user may remotely watch a video feed of the user's house being burglarized and the user triggers the receiving sensors to receive identifying characteristics.

Upon receiving the identifying characteristic from the detecting device or other device associated with the detecting device, at 302, an embodiment may broadcast at least one identifying characteristic. For example, the system may broadcast the identifying characteristic to a network, which may include one or more other devices. In other words, the system may broadcast the identifying characteristic to other device via a network. In an embodiment, the broadcast may be provided over any type of network capable of conveying information, for example, the identifying characteristic(s), to other user devices. These networks may include cellular networks, internet, wireless communication, local area networks, wide area networks, satellite, social media, navigation systems, radio data service, or the like. The network may be managed or owned by a government, law enforcement agency, government agency, or private entity.

The network may include at least one device capable of receiving the broadcast of the identifying characteristic. Using the working example started above, the wireless ID of the burglar captured during the crime may be broadcast to a network of smartphones. The network may include devices that have opted-in to the network. For example, a user may choose to be part of the network. As another example, the system may simply broadcast the identifying characteristic to all devices on the cellular network, all devices on the wireless network, all devices on a local network, or the like. As another example, the system may be used in conjunction with a Silver Alert. In other words, all devices, regardless of network, may receive the broadcast. The broadcast may be in a local area or a larger geographic region based upon time of flight considerations. In other words, the system may identify a localized group of devices or individuals that are most likely to be in contact with the target individual and may provide the broadcast to only those devices. Alternatively, the system may simply broadcast to all devices.

The broadcast may include the identifying characteristic or information derived from the identifying characteristic, for example, a wireless ID, picture, license plate, or any other identifying characteristic of the individual to be located. The broadcast may include an active or passive broadcast. An active broadcast may include a broadcast that notifies a user that a broadcast has been received, for example, a text message, a picture message, a pop-up notification, an audible alert, or the like. In other words, once the broadcast is received the user is notified that the broadcast exists. On the other hand, a passive broadcast may include a broadcast that is sent to a device but a user is not alerted to receipt of the broadcast. In other words, the broadcast may include instructions to the device to be in search of a particular identifying characteristic without the user of the device knowing that the device is attempting to locate the identifying characteristic. As an example, if the identifying characteristic includes a wireless ID, the broadcast may include instructions to the device to be on the lookout for that wireless ID without alerting the user of the device.

At 303 the system may determine if an indication of receipt of the identifying characteristic has been received by one or more devices within the network. Using the working example, the network may broadcast the wireless ID of the burglar. If a user device that received the wireless ID locates another device within proximity to the device having the wireless ID, the device may send a notification or indication to the system that the device has received the identifying characteristic from another device within proximity to the device. In other words, the system may receive an indication from a network connected device when the identifying characteristic is obtained or received at the network connected device.

In an embodiment, receiving an indication may include receiving an indication that the identifying characteristic is in proximity to the at least one device. Receiving an indication may also include receiving an indication that the identifying characteristic has previously been in proximity to the device. For example, if a person associated with the identifying characteristic was previously at home, the home system may notify the system that the identifying characteristic was previously detected and provide a time of detection. In other words, the receipt of the identifying characteristic may occur at any time, including before broadcast of the alert, at any device that may be able to provide additional information regarding the individual associated with the identifying characteristic. Thus, the system can capture additional identifying characteristics of the individual from other devices that are in proximity to the individual, have been previously in proximity to the individual, or that have other information associated with the individual. As an example, a cellular network receiving a wireless ID may have information that associates a name to the wireless ID. Thus, the indication may include indicating that the device has additional information associated with the identifying characteristic even though the device is not currently or has never been in proximity to the individual or device of the individual.

If the system does not receive an indication of the receipt of an identifying characteristic at an at least one device at 303, the system may do nothing at 304. Alternatively, the system may provide an indication or notification of the inability to find the identifying characteristic to the system. This output may be visual, audible, via message, stored to a database, or the like. Additionally or alternatively, the system may place an identifying characteristic that cannot be located in a list where the system continues to search for the unfound identifying characteristic. The system may provide an indication to the system if the unfound identifying characteristic is identified at some point in the future.

If, however, the system does receive an indication of receipt of the identifying characteristic at 303, the system may, at 305, perform an action responsive to an indication. For example, the system may gather or capture additional information about the user associated the identifying characteristic. In an embodiment, an action may include requesting a user to capture at least one additional identifying characteristic. For example, a burglar's wireless ID may be received from the system at the time of the burglary. However, the system may have no additional information identifying the burglar. Thus, if at least one device captures the wireless ID of the burglar, the system may request the user of the capturing device to take a picture of the burglar or a vehicle of the burglar. Afterwards, the system may then associate the captured image with the wireless ID of the burglar.

Thus, a notification provided by the system to the user may instruct the user of the capturing device to take image capture data. The image capture data may include image captures of a person, vehicle, license plate, associates, places, or the like. Alternatively, a notification may instruct a user of a capturing device to collect biometric data of the user associated with the identifying characteristic. As another example, a notification may instruct a user of a capturing device to collect location data of the user associated with the identifying characteristic. For example, the system may request location information from the capturing device and associate this location data with the target individual. Additionally, the system may provide a notification to the user that does not request the user perform any action, but rather alerts the user of the capturing device that the user associated with the identifying characteristic may be a suspect of a crime, a missing person, abducted child, may be dangerous, or the like. The notification may be visual, audible, haptic, shown on an augmented reality device, or any combination or the like.

In an embodiment, performing an action may include an identity of the target individual. Determining the identity may include associating captured identifying characteristics and searching databases or other data sources to determine if the individual has been specifically identified in one of these data sources. In an embodiment, the system may determine the identity by associating an acquired identifying characteristic with the received identifying characteristic. In others words, the system may utilize a received picture and associate the picture with the identifying characteristic. For example, during a burglary a home security system may receive image capture data in the form of a picture of the burglar. The system may associate the received picture with an identifying characteristic. For example, another user's smartphone camera or a surveillance camera at another location may associate the home security image with the image on the another device. Thereafter, the device may capture further identifying information that can be used to specifically identify the target individual.

In an embodiment, performing an action may include determine an identity of the user by accessing a database which have identifying characteristics associated with identified users. The determining of an identity of the user may include comparing an at least one received identifying characteristic to a database or other source of information. For example, if an identifying characteristic is a license plate, the system may compare this license plate to a department of motor vehicles database. If an identifying characteristic is an image capture of a face, the system may compare, for example, using facial recognition software, the image capture of the face to other data sources, for example, "wanted" posters, mugshots, surveillance footage, or the like. As another example, if the identifying characteristic is a wireless ID, the system may compare the wireless ID to a database of wireless providers or to wireless IDs captured at the time of other crimes. The system may compare any received identifying characteristic to a database of identified or unidentified identifying characteristics to assist with the identification of the user associated with the identifying characteristic.

In an embodiment, performing an action may include accessing a location of the identifying characteristic based upon a location of the at least one device. For example, the wireless ID of a burglar associated with the identifying characteristic may be in proximity to a device. The device in proximity of the wireless ID of the burglar may be able to provide location data allowing the system to co-locate the burglar's wireless ID to the device which may then provide an estimated location of the burglar.

In an embodiment, a performing an action may send a notification of the location, an alert of receipt of additional identifying characteristics, or other information regarding the receipt of the indication to another device. For example, the system may send a notification to a third device. This third device may be the victim of a crime, a parent of a missing child, relative of a lost senior citizen, a law enforcement agency, government agency, or the like. The system may transmit a notification containing all or a portion of the identifying characteristics to the third device. For example, if the third device is law enforcement, then the system may transmit all the information of the identifying characteristics. As another example, if the third device is the burglarized homeowner, the homeowner may receive a notification to contact the authorities that an identification of the burglar may have been made.

Such a system provides a technical improvement to current systems for locating individuals. The described system utilizes networked devices to provide additional functionality to current individual location systems. Rather than requiring individuals themselves receive and identify identifying characteristics, the described systems and methods can broadcast identifying characteristics to networked devices, thereby alerting the device to be on the lookout for the identifying characteristic. Thus, instead of the traditional systems to alert a population or request assistance in looking for a person, the system may recruit any device capable of receiving identifying characteristics to locate a person associated with the identifying characteristic. In other words, the system provides a technique for allowing the user to identify a user using identifying characteristic associated with the user that is not provided using conventional techniques.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method performed by a monitoring system, comprising:
    receiving, from at least one sensor in an area, an identifying characteristic associated with a user and a location, wherein the location comprises the area and a surrounding environment, wherein the identifying characteristic comprises at least one of a wireless identifier of a device associated with the user and a feature associated with the user;
    broadcasting the identifying characteristic, the wireless identifier, and instructions relating to capturing at least one additional identifying characteristic of the user to a network of devices, wherein the network of devices comprises a plurality of devices within a time of flight geographic region capable of receiving the broadcast of the identifying characteristic, where the receipt of the identifying characteristic includes a GPS tag, the network of devices comprising the at least one sensor and at least one other device of at least one other user outside both of the area and the location, wherein the network of devices comprises devices not in the location at the time the user was in the area, wherein the network of devices is selected based upon an expected location of the user with respect to the area, the expected location and the time of flight geographic location being determined based upon a time of flight of the user from the area in which the identifying characteristic was received;
    thereafter receiving, from at least one device outside the area of the at least one sensor and within the network of devices and at the network, an indication of detection of the identifying characteristic, the GPS tag, and the at least one additional identifying characteristic of the user at a position near the at least one device; and
    performing, responsive to the indication, an action, wherein the action comprises identifying the user is a target individual based upon searching a data source to determine the at least one additional identifying characteristic of the user is associated with information from the data source and sending an alert notification to a third device, wherein the notification transmits at least a portion of the additional identifying characteristic.

2. The method of claim 1, wherein the receiving an identifying characteristic comprises receiving image capture data.

3. The method of claim 1, wherein the receiving an indication comprises receiving an indication that the identifying characteristic is in proximity to the at least one device.

4. The method of claim 3, wherein the performing an action comprises sending a request to the at least one device to capture at least one additional identifying characteristic associated with the user.

5. The method of claim 1, wherein the performing an action comprises determining an identity of the user.

6. The method of claim 5, wherein the determining the identity comprises associating an acquired identifying characteristic with the received identifying characteristic.

7. The method of claim 5, wherein the determining the identity comprises accessing a database comprising identifying characteristics associated with identified users.

8. The method of claim 1, wherein the performing an action comprises identifying a location of the identifying characteristic based upon a location of the at least one device.

9. The method of claim 8, wherein the performing an action comprises sending a notification of the location of the identifying characteristic to another device.

10. The method of claim 1, wherein the receiving an indication comprises receiving an indication that the identifying characteristic was previously captured at the at least one device.

11. An information handling device of a monitoring system, comprising:
    a display device;
    a processor;
    a memory device that stores instructions executable by the processor to:
        receive, from at least one sensor in an area, an identifying characteristic associated with a user and a location, wherein the location comprises the area and a surrounding environment, wherein the identifying characteristic comprises at least one of a wireless identifier of a device associated with the user and a feature associated with the user;

broadcast the identifying characteristic, the wireless identifier, and instructions relating to capturing at least one additional identifying characteristic of the user to a network of devices, wherein the network of devices comprises a plurality of devices within a time of flight geographic region capable of receiving the broadcast of the identifying characteristic, where the receipt of this identifying characteristic includes a GPS tag, the network of devices comprising the at least one sensor and at least one other device of at least one other user outside both of the area and the location, wherein the network of devices comprises devices not in the location at the time the user was in the area, wherein the network of devices is selected based upon an expected location of the user with respect to the area, the expected location and the time of flight geographic location being determined based upon a time of flight of the user from the area in which the identifying characteristic was received;

thereafter receive, from at least one device outside the area of the at least one sensor and within the network of devices and at the network, an indication of detection of the identifying characteristic, the GPS tag, and the at least one additional identifying characteristic of the user at a position near the at least one device; and perform, responsive to the indication, an action, wherein the action comprises identifying the user is a target individual based upon searching a data source to determine the at least one additional identifying characteristic of the user is associated with information from the data source and sending an alert notification to a third device, wherein the notification transmits at least a portion of the additional identifying characteristic.

12. The method of claim 11, wherein the receiving an identifying characteristic comprises receiving image capture data.

13. The method of claim 11, wherein the receiving an indication comprises receiving an indication that the identifying characteristic is in proximity to the at least one device.

14. The method of claim 13, wherein the performing an action comprises sending a request to the at least one device to capture at least one additional identifying characteristic associated with the user.

15. The method of claim 11, wherein the performing an action comprises determining an identity of the user.

16. The method of claim 15, wherein the determining the identity comprises associating an acquired identifying characteristic with the received identifying characteristic.

17. The method of claim 15, wherein the determining the identity comprises accessing a database comprising identifying characteristics associated with identified users.

18. The method of claim 11, wherein the performing an action comprises identifying a location of the identifying characteristic based upon a location of the at least one device.

19. The method of claim 18, wherein the performing an action comprises sending a notification of the location of the identifying characteristic to another device.

20. A product for a monitoring system comprising:
a storage device having code stored therewith, the code being executable by a processor and comprising:

code that receives, from at least one sensor in an area, an identifying characteristic associated with a user and a location, wherein the location comprises the area and a surrounding environment, wherein the identifying characteristic comprises at least one of a wireless identifier of a device associated with the user and a feature associated with the user;

code that broadcasts the identifying characteristic, the wireless identifier, and instructions relating to capturing at least one additional identifying characteristic of the user to a network of devices, wherein the network of devices comprises a plurality of devices within a time of flight geographic region capable of receiving the broadcast of the identifying characteristic, where the receipt of this identifying characteristic includes a GPS tag, the network of devices comprising the at least one sensor and at least one other device of at least one other user outside both of the area and the location, wherein the network of devices comprises devices not in the location at the time the user was in the area, wherein the network of devices is selected based upon an expected location of the user with respect to the area, the expected location and the time of flight geographic location being determined based upon a time of flight of the user from the area in which the identifying characteristic was received;

code that thereafter receives, from at least one device outside the area of the at least one sensor and within the network of devices and at the network, an indication of detection of the identifying characteristic, the GPS tag, and the at least one additional identifying characteristic of the user at a position near the at least one device; and code that performs, responsive to the indication, an action, wherein the action comprises identifying the user is a target individual based upon searching a data source to determine the at least one additional identifying characteristic of the user is associated with information from the data source and sending an alert notification to a third device, wherein the notification transmits at least a portion of the additional identifying characteristic.

* * * * *